United States Patent [19]

Seki et al.

[11] Patent Number: 5,414,807
[45] Date of Patent: May 9, 1995

[54] METHOD OF NC DATA PREPARATION FOR REPEATED PATTERNS

[75] Inventors: Masaki Seki, Tokyo; Takashi Takegahara, Hachioji; Toru Matsunaka, Yanai, all of Japan

[73] Assignee: Fanuc Ltd, Minamitsuru, Japan

[21] Appl. No.: 752,548
[22] PCT Filed: Jan. 25, 1991
[86] PCT No.: PCT/JP91/00083
§ 371 Date: Oct. 17, 1991
§ 102(e) Date: Oct. 17, 1991
[87] PCT Pub. No.: WO91/11761
PCT Pub. Date: Aug. 8, 1991

[30] Foreign Application Priority Data

Jan. 25, 1990 [JP] Japan .................. 2-13656

[51] Int. Cl.$^6$ ............................. G06F 15/62
[52] U.S. Cl. .................... 395/142; 395/141; 395/155; 395/161; 364/474.24
[58] Field of Search .................. 395/140–143, 395/155–161; 364/474.03–474.06, 474.24

[56] References Cited

U.S. PATENT DOCUMENTS 4,740,902  4/1988  Yoneda et al. .......... 364/474.06
4,962,472  10/1990  Seki et al. ................ 395/161
5,101,363  3/1992  Rutkowski .............. 364/474.24

Primary Examiner—Almis Jankus
Attorney, Agent, or Firm—Staas & Halsey

[57] ABSTRACT

A multiple-layout designation method rapidly and easily performs preparatory work for numeral control (NC) data preparation, in which one of contours displayed on a graphic display of an automatic programming device is manually selected as an NC data preparation object (S1), and the necessity of contour duplication is manually selected (S2). When the original contour is duplicated on the display by a processor of the programming device in response to manual setting of the name of a contour group consisting of the displayed contour and duplicated contours to be obtained by duplication (S3 and S4), or when the name of the displayed contour is manually set (S6), contour data for the contour or the contour group is generated. After setting of all the names of all the contour(s) or contour group(s) as NC data preparation objects, machining condition data associated with the contour name, or common to the original contour and the duplicated contour and serving as the machining condition data regarding the contour name, is manually set (S7 and S8). After setting of all the machining condition data, NC data employed for machining of each of the contour(s) and the contour group(s) are automatically prepared based on the contour data and the machining condition data concerned (S10).

2 Claims, 2 Drawing Sheets

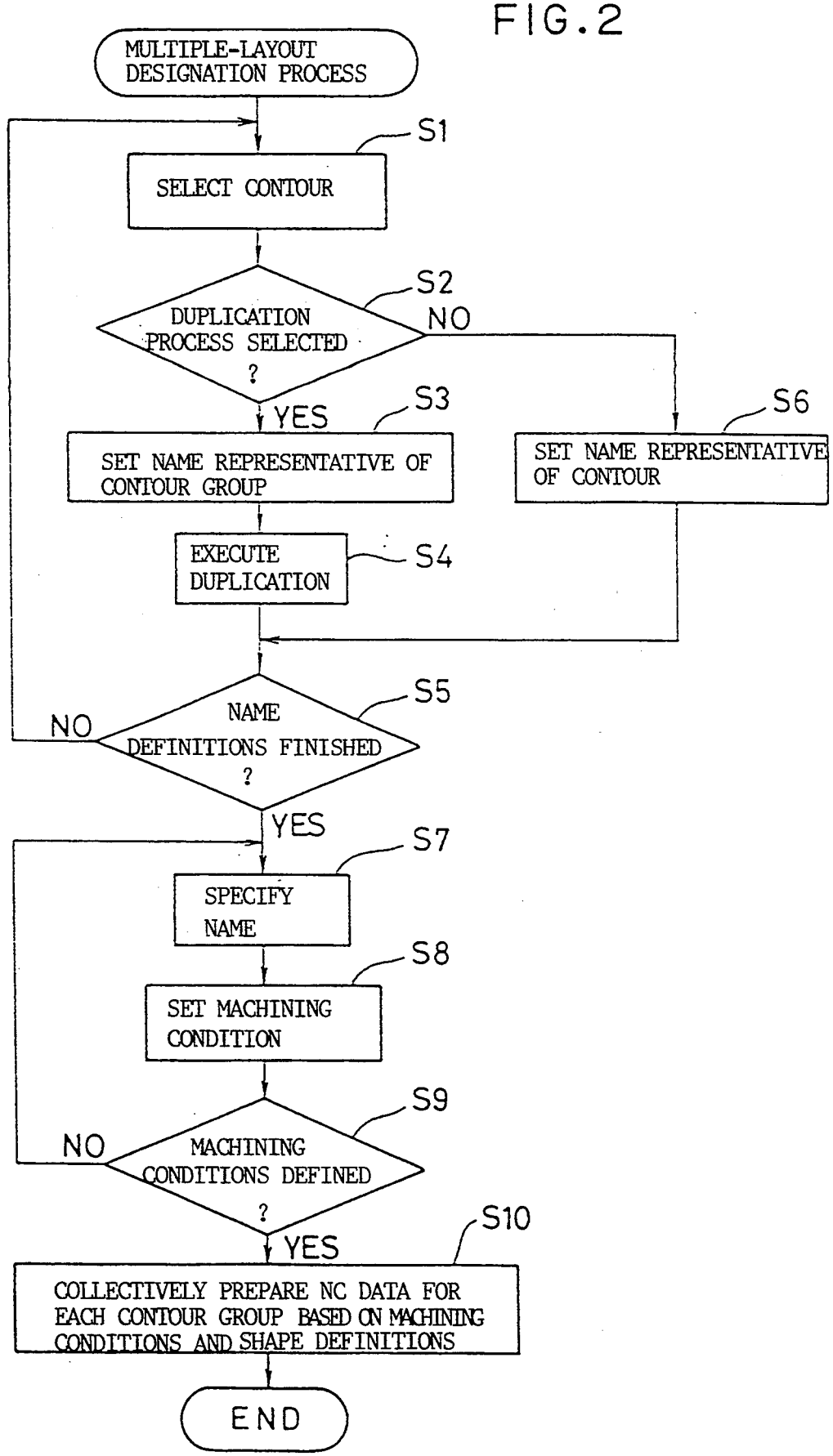

METHOD OF NC DATA PREPARATION FOR REPEATED PATTERNS

BACKGROUND OF THE INVENTION

1. Field of the Invention

The present invention relates to a multiple-layout designation method capable of rapidly and easily effecting preparatory work for automatic preparation of NC data which is employed for machining of machined objects of an identical contour.

2. Description of the Related Art

It has been conventionally known to arrange contours, which are identical to each other, in position on a graphic display by utilizing a multiple-layout (multi-cavity) duplication method for duplicating a desired number of times a single contour displayed on the graphic display. This technique has been adopted, e.g., in the field of metal mold designing. Also, it has been known to prepare numerical control (NC) data employed for machining of machined objects, having contours arranged on the display in the above manner, by the use of an automatic programming device. In this case, an operator makes the programming device recognize the original contour and each of the duplicated contours, defines a name of each of the contours, and then sequentially sets machining conditions respectively associated with these names. After such preparatory work is finished, NC data associated with each of the names is automatically prepared by means of the programming device based on the contour and the machining condition concerned.

According to the conventional method, it is required to individually define the names respectively corresponding to the contours which are identical to each other, and to set the machining conditions respectively associated with these names. Thus, the preparatory work for the NC data preparation requires time and labor.

SUMMARY OF THE INVENTION

It is an object of the present invention to provide a multiple-layout designation method by which preparatory work for automatic NC data preparation can be performed rapidly and easily.

To achieve the aforementioned object, according to the present invention, a multiple-layout designation method for automatic NC data preparation is provided, which comprises the steps of: (a) duplicating, on a graphic display, an arbitrary one original contour manually selected from original contours displayed on the graphic display, to thereby generate at least one duplicated contour; (b) generating contour data representative of a contour group consisting of the one original contour and at least one duplicated contour; (c) manually defining a name of the contour group; (d) manually setting machining condition data associated with the contour group name; and (e) automatically and collectively preparing, based on the contour data and the machining condition data, NC data employed for machining associated with machining of the contour group.

As described above, according to the present invention, the NC data employed for the machining associated with the contour group is automatically and collectively prepared based on the contour data representative of the: contour group, which consists of an arbitrary one contour manually selected from original contours displayed on the graphic display and at least one duplicated contour obtained by duplicating the original contour, and the machining condition data manually set in relation to the contour group name defined manually. Thus, all the preparatory work required for the preparation of the NC data, which is employed for machining associated with the contour group, can be carried out rapidly and easily by only performing the name definition and the machining condition setting once for each. This makes it possible to greatly reduce time and labor needed for the preparatory work.

BRIEF DESCRIPTION OF THE DRAWINGS

FIG. 2 is a flow chart showing a multiple-layout designation process carried out by the CPU shown in FIG. 1.

DESCRIPTION OF THE PREFERRED EMBODIMENT

Figure 1:
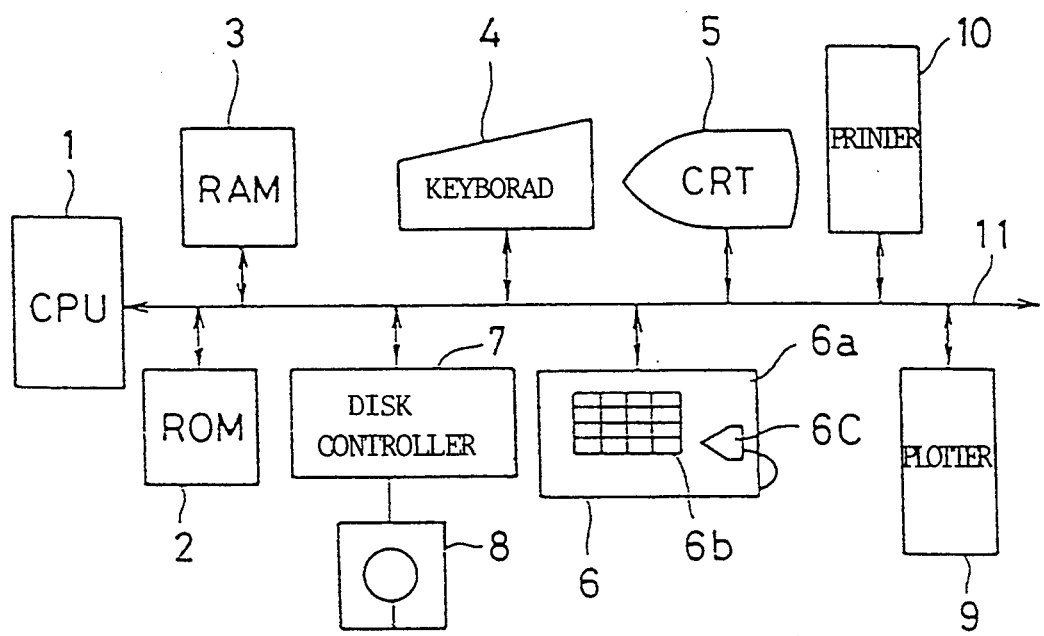
FIG. 1 is a block diagram showing an essential part of an automatic programming device for embodying a multiple-layout designation method according to one embodiment of the present invention.

Referring to FIG. 1, an automatic programming device for embodying one embodiment of the present invention comprises a processor (CPU) 1, a read-only memory (ROM) 2 storing therein a program used for control of the programming device, and a random access memory (RAM) 3 for temporal storage of various data including NC data, a system program, etc., and also comprises a keyboard 4, a graphic display (CRT) 5, and a tablet degree 6. The tablet device 6 is arranged to enable an operator to peek required ones of various items on a menu list 6b provided on the tablet screen 6a, with use of a tablet cursor 6e, to thereby select a necessary work menu, and select an arbitrary one of contours displayed on CRT 5, with the cursor 6c which is interlocked with a graphic cursor on the CRT 5. This tablet device is employed for contour designing, together with the keyboard 4.

Moreover, the programming device is provided with a disk controller 7 adapted to be loaded with a floppy disk 8, a plotter 9 for drawing a prepared drawing, and a printer 10. The floppy disk 8 is stored with a conventional system program for CAD/CAM used for contour design, and a program for multiple-layout designation process, mentioned later. The system program is arranged to store contour data representative of a contour defined during the contour designing, and machining condition data. Reference numeral 11 denotes busses which connect the CPU 1 to the elements 2 to 7, 9 and 10.

With reference to FIG. 2, a multiple-layout designation process performed by the programming device will be explained hereinbelow.

Figure 3:
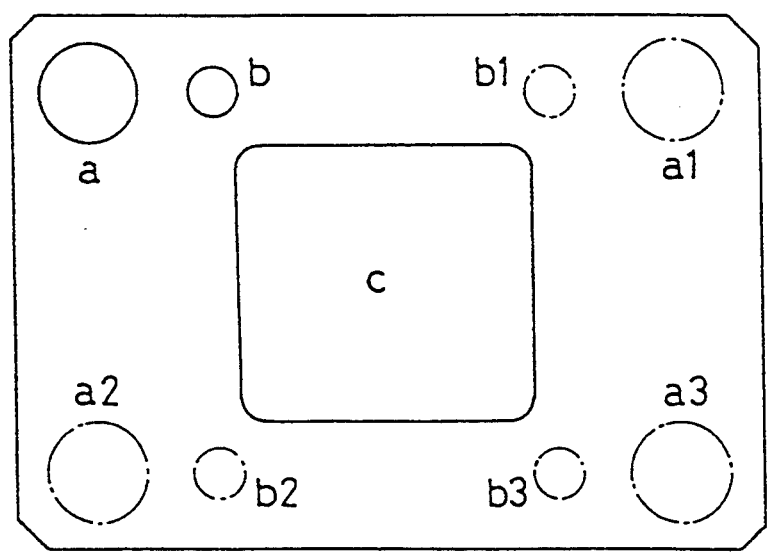
FIG. 3 is a diagram showing, by way of example, various contours displayed on the CRT shown in FIG. 1.

Prior to the multiple-layout designation process, the program and the contour data for this process are loaded in RAM 3 from the floppy disk 8. Then, under the control of the CPU 1, various contours, e.g., first to third original contours a, b and c shown in FIG. 3, are displayed on CRT 5 based on the contour data.

Upon start of the multiple-layout designation process, the CPU 1 causes the CRT 5 to display a first message to request selection of an original contour as an object for NC data preparation, and then enters its stand-by state (Step S1). In response to the first message, an operator judges which of the original contours a to c displayed on CRT 5 is to be selected for the first time, and judges whether or not the above original contour to be selected first should be duplicated. In case that the first contour a which should be duplicated is selected first, the operator picks an item "duplication" on the menu list 6b and inputs various data for duplication, including duplication positions, through the keyboard 4, prior to a pick operation for selecting the first contour. There are three types of duplication, that is, "movement", "rotation" and "reverse". Then, the operator picks the first contour a with use of the tablet device 6.

When the contour a is picked subsequently to the pick input of the item "duplication", the CPU 1 judges that a duplication process has been selected (Step S2), and causes the CRT 5 to display a second message to request the definition of a name representative of a contour group consisting of the original contour a and duplicated contours a1 to a3 which will be generated by the duplication process, mentioned later (generally, a contour group consisting of the original contour and one or more duplicated contours). Then, the CPU enters the stand-by state. When the operator inputs, through the keyboard, the name representative of the contour group, e.g., a first name A, in response to the second message, the CPU 1 causes the RAM 3 to store the input first name A (Step S3), and carries out the duplication process based on the duplication data previously manually input, so as to generate the contours a1 to a3 (generally, one or more duplicated contours) on the graphic display. Moreover, the CPU 1 collectively recognizes the first contour group consisting of the original contour a and the duplicated contours a1 to a3, generates contour data indicative of the whole of the first contour group recognized as above, and causes the RAM 3 to store the contour data in such a manner that the data corresponds to the first name A previously input (Step S4).

Next, the CPU 1 monitors whether an "R0" key of the keyboard 4 is operated and whether an item "addition" is picked on the menu list 6b, so as to judge whether or not all the names of the contours as objects of the NC data preparation have been defined (Step S5). In the example shown in FIG. 3, since the second and the third contours b and c which are remaining NC data preparation objects exist, the operator picks the item "addition" on the menu list 6b. In this case, the CPU 1 judges at Step S5 that the name definition should be continued, and returns to Step S1 where it causes the CRT to display the first message to request the contour selection again. When the operator picks, e.g., the second contour h after the pick input of the item "duplication", the CPU 1 causes the second message to request the contour group name definition to be displayed again. When the second name B indicative of the contour group is manually input, the CPU 1 causes the RAM 3 to store the name B (Step S3), and generates duplicated contours b1 to b3 from the original contour b. Further, the CPU 1 collectively recognizes the second contour group including these four contours, and causes the RAM 3 to store the contour representative of the whole of the contour group in a manner corresponding to the second name B (Step S4).

Next, the CPU 1 makes a judgment again as to whether or not all the names of the contours which are NC data preparation objects have been defined (Step S5). In the example of FIG. 3, as the third contour c which is the last NC data preparation object exists, the item "addition" is picked, so that the judgment result given at Step S5 becomes negative. Thus, the first message to request the contour selection is displayed again (Step S1). As the duplication of the contour c is unnecessary, the operator simply picks the contour c, without making the pick input of the item "duplication". In this case, the CPU judges that the duplication process has not been selected (Step S2), and causes the CRT 5 to display a third message to request definition of the name of the selected contour c. When the third name C representative of the selected contour c is manually input, the CPU 1 stores the recognized contour c in RAM 3 in a manner corresponding to the third name C (Step S6).

Next, the CPU 1 judges again whether or not all the names of the contours which are NC data preparation objects have been defined (Step S5). In the example of FIG. 3, as all of the contours as in the NC data preparation objects have been selected, the operator operates the "R0" key. In this case, the CPU 1 judges at Step S5 that the name definition has been completed, causes the CRT 5 to display a fourth message to request the name designation for the contour group or the contour for which a machining condition is to be set, so as to start a machining condition setting process, and then enters the stand-by state.

In the example shown in FIG. 3, the operator manually inputs, e.g., the first name A through the keyboard 4, so as to set the machining condition on the first contour group. The CPU 1 stores the input name A temporarily (Step Se). Next, the operator manually inputs the data representative of the machining condition on the first contour group. Normally, since the machining condition on the original contour a which belongs to the first contour group is equal to the machining conditions on the duplicated contours a1 to a3 which belong to this contour group, it is sufficient to input, e.g., the machining condition on the original contour a as the machining condition of the first contour group. Upon completion of the data input, the CPU 1 causes the RAM 3 to store the input machining condition data in a manner corresponding to the first name A (Step S8). Next, the CPU 1 monitors whether the "R0" key on the keyboard 4 is operated and whether the item "addition" is picked on the menu list 6b, so as to make a judgment as to whether or not machining conditions on all the names as the objects for which machining conditions are to be set have been defined (Step S9).

Here, since the second and third names B and C represent remaining objects for setting the machining conditions, the operator picks the item "addition". In this case, the CPU 1 judges that the machining condition setting process should be continued, and stands by for designation of the names again. When the second name B, for instance, is manually input thereafter in order to set the machining condition associated with the second contour group, the CPU 1 temporarily stores the name B thus input (Step S7). Next, when the data representative of the machining condition on the second original contour b constituting the contour group concerned is manually input as the machining condition on the second contour group, the CPU 1 causes the RAM 3 to store the input machining condition data in a manner corresponding to the second name B (Step S8). Then, the CPU judges again whether or not the machining conditions on all the names for which the machining conditions are to be set have been defined (Step S9).

Here, there exists the third name C as the last object for which the machining condition must be set. Thus, the operator picks the item "addition," and then manually inputs the third name C and data representative of the machining condition on the third contour c one after another. The CPU 1 causes the RAM 3 to store therein this machining condition data in a manner corresponding to the third name C (Step S8), and judges again whether or not the machining conditions on all the names for which the machining conditions must be set have been defined (Step S9). As the operator has completed input of the machining condition data on each of the first to the third names A to C, he operates the "R0" key. When the end of the machining condition setting process is judged at Step S9 in response to this key operation, the CPU 1 starts an NC data preparation process (Step 10).

In the NC data preparation process, the CPU 1 reads out, from the RAM 3, the name representative of a first NC data preparation object, e.g., the first name A, the contour data corresponding to the first name A and representative of the whole of the first contour group which has been recognized collectively, and the machining condition data corresponding to the first name A and common to the original contour and the duplicated contours which constitute the first contour group. Next, the CPU 1 automatically prepares the first NC data employed for machining of the original contour a and the duplicated contours a1 to a3, which constitute the first contour group, based on the contour data representative of the first contour group and the machining condition data corresponding to the first name A. Next, the CPU 1 reads out, from the RAM 3, the second name B representative of the next NC data preparation object, the contour data corresponding thereto and representative of the whole of the second contour group, and the machining condition data corresponding to the second name B, and automatically prepares the second NC data employed for machining of the original contour b and the duplicated contours b1 to b3 constituting the second contour group, based on the contour data representative of the second contour group and the machining condition data corresponding to the second name B. Moreover, the CPU 1 reads out, from the RAM 3, the third name C representative of the last NC data preparation object, the contour data corresponding thereto and indicative of the third contour c, and the machining condition data corresponding to the third name c, and automatically prepares the third NC data employed for machining associated with the third contour c, based on the contour data and the machining condition data. Then, the first to the third NC data which have been prepared as mentioned above are stored in an NC data memory area of RAM 3, whereby the multiple-layout designation process shown in FIG. 2 is completed. The first to the third NC data are transferred to the floppy disk 8, if necessary.

The present invention is not limited to the above preferred embodiment, and various variations thereof may be made.

For example, in the embodiment, a common machining condition is set at Step S8 in FIG. 2 for the contours belonging to the same contour group. Alternatively, different machining conditions may be sequentially set for the contours constituting the same contour group. Although the name of the contour group is defined at Step 3 precedent to the duplication process of Step S4 in the preferred embodiment, the name may be defined after the duplication process. Moreover, in the embodiment, all the contours associated with the same machining condition are defined by generating the duplicated contours based on the original contour which has been selected at Step S1 in FIG. 2. Alternatively, all the contours may be picked instead of executing Steps S1 to S4, if all the contours associated with the same machining condition have been already defined prior to the multiple-layout designation process shown in FIG. 2.

What is claimed is:

1. A multiple-layout designation method for automatic numerical control data preparation, comprising the steps of:
   (a) judging whether an original contour should be duplicated;
   (b) automatically duplicating, on a graphic display, said original contour manually selected from original contours displayed on the graphic display, to thereby generate, at a location different from said original contour, at least one duplicated contour having a shape and size matching the original contour, when said judging in step (a) determines that said original contour should be duplicated;
   (c) automatically generating contour data representative of a contour group consisting of said original contour and said at least one duplicated contour when said judging in step (a) determines that said original contour should be duplicated;
   (d) inputting a name of said contour group when said judging in step (a) determines that said original contour should be duplicated;
   (e) storing machining condition data associated with the name of said contour group when said judging in step (a) determines that said original contour should be duplicated;
   (f) automatically preparing, based on said contour data and said machining condition data, numerical control data for machining associated with said contour group when said judging in step (a) determines that said original contour should be duplicated;
   (g) inputting a name of said original contour when said judging in step (a) determines that duplication of said original contour is unnecessary;
   (h) storing machining condition data associated with the name of said original contour when said judging in step (a) determines that duplication of said original contour is unnecessary; and
   (i) preparing numerical control data for machining associated with said original contour instead of preparing the numerical control data for machining associated with said contour group when duplication is judged unnecessary in step (a).

2. A multiple-layout designation method for automatic numerical control data preparation, comprising the steps of:
   (a) automatically duplicating, on a graphic display, an original contour manually selected from original contours displayed on the graphic display, to thereby generate, at a location different from said original contour, at least one duplicated contour having a shape and size matching the original contour;
   (b) automatically generating contour data representative of a contour group consisting of said original contour and said at least one duplicated contour having a shape identical to said original contour;

(c) inputting a name of said contour group;

(d) storing a machining condition associated with one of said original contour and said at least one duplicated contour as machining condition data associated with said contour group name; and (e) automatically preparing, based on said contour data and said machining condition data, numerical control data for machining associated with said contour group.

* * * * *